(No Model.)

R. BELFIELD.
AUTOMATIC REGULATOR FOR ELECTRIC LAMPS.

No. 386,796. Patented July 31, 1888.

Witnesses
Geo. W. Breck.
Carrie E. Ashley

Inventor
Reginald Belfield,
By his Attorneys
Pope & Edgcomb

UNITED STATES PATENT OFFICE.

REGINALD BELFIELD, OF GREAT BARRINGTON, MASSACHUSETTS, ASSIGNOR TO GEORGE WESTINGHOUSE, JR., OF PITTSBURG, PENNSYLVANIA.

AUTOMATIC REGULATOR FOR ELECTRIC LAMPS.

SPECIFICATION forming part of Letters Patent No. 386,796, dated July 31, 1888.

Application filed June 29, 1886. Serial No. 206,567. (No model.)

*To all whom it may concern:*

Be it known that I, REGINALD BELFIELD, a subject of the Queen of Great Britain, temporarily residing in Great Barrington, in the county of Berkshire and State of Massachusetts, have invented certain new and useful Improvements in Automatic Regulators for Electric Lamps, of which the following is a specification.

This invention relates, generally, to those systems of electric distribution in which alternating intermittent or pulsatory electric currents derived from any convenient source of electrical energy are employed. Such currents are usually transmitted through the primary coils of one or more inductoriums or converters, and the currents thereby induced in the secondary coils are employed for operating translating devices—such, for example, as incandescent electric lights.

The object of this invention is to provide means for securing such automatic regulation as to at all times insure a desired difference of potential on the working circuit or circuits during all the varying conditions to which the system is subject.

The further object of the invention is to render it possible to diminish or increase the brilliancy of the lights as may be desired, and, having determined the required brilliancy, to render it constant.

Figure 1:
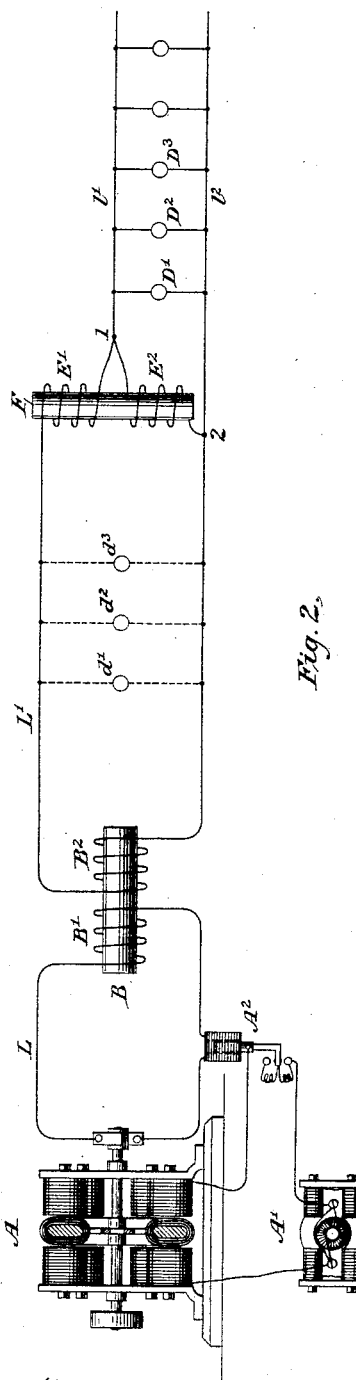
Figure 2:
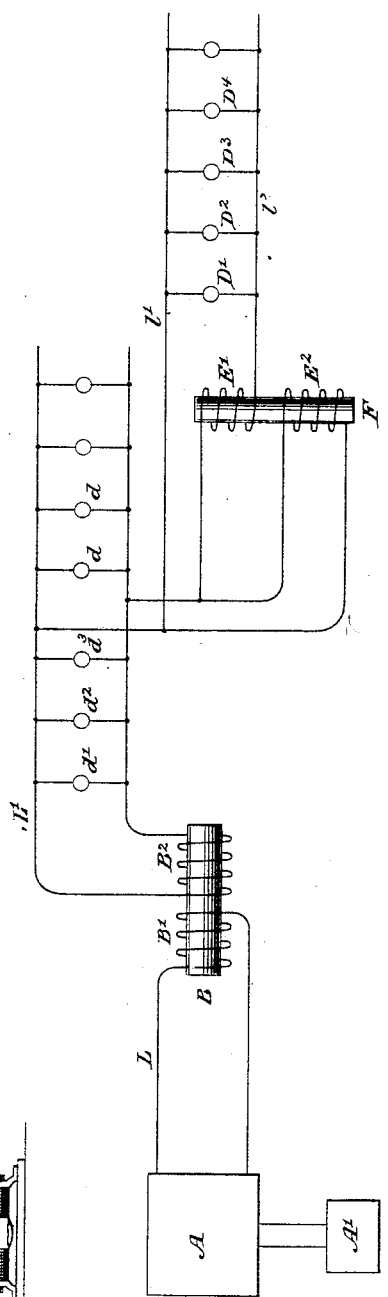

In the accompanying drawings, Figure 1 is a diagram illustrating one method of organizing the circuits and apparatus for carrying out the invention, and Fig. 2 illustrates a modification.

Referring to Fig. 1, A represents a magneto or dynamo electric generator or other convenient source of electricity. The generator is designed to transmit alternating intermittent or pulsatory currents upon a main line, L, and it is constructed in any well-known manner, having its field-magnets supplied by a dynamo, A', and provided with an automatic governor, as indicated at $A^2$, for the purpose of automatically maintaining a constant current in its external circuit, or a current having one factor constant and the other variable, under conditions of varying resistance.

An induction apparatus, B, of any suitable character, herein termed a "converter," has its primary coil B' included in the primary circuit L. The coil $B^2$ is included in a secondary circuit, L', which supplies the current necessary to operate translating devices—such, for instance, as incandescing electric lamps D' $D^2$ $D^3$, &c. These last-named devices are in this instance included in multiple arc between two supply-conductors, $l'$ $l^2$.

A core, F, of soft iron, provided with two coils, E' and $E^2$, is employed as a regulator. The coils are applied by means of any suitable and convenient arrangement of winding to the soft-iron core F. The coil E' is included in series with the translating devices and the secondary coil $B^2$, and the coil $E^2$ is placed in multiple arc with the lamps.

The conductor $l'$ leads from the point 1, where the coils E' and $E^2$ are united, and the conductor $l^2$ leads from a point, 2, at the other terminal of the coil $E^2$. The translating devices D' $D^2$ $D^3$, &c., are included between these conductors, and thus the coil $E^2$ is a shunt upon the translating devices. In other words, two paths are offered to the current between the points 1 and 2—namely, through the coil $E^2$ and through the translating devices. The number of lights or translating devices included between the two conductors $l'$ and $l^2$ will therefore determine the amount of current to be supplied. It will be evident, therefore, that as the number of lights included in multiple arc is increased the resistance of the circuit will be decreased and more current will tend to traverse the coil E'. The first effect would be a decrease in the brilliancy of the lamps; but immediately the current flowing through the coil E' causes a counter electro-motive force to the original current in the coil $E^2$, which counter electro-motive force increases with the electro-motive force at the terminals of the coil E'. This may become higher than that of the original current, in which case the current flows in the opposite direction to that of the coil E'. This counter electro-motive force represents the work done in the primary in two ways: first, by preventing as much current flowing through the secondary as there originally was, and, second, by giving up current to the main circuit when the counter electro motive force becomes higher than that in the main circuit. In both these cases the work done by the primary is given up by the secondary, which affords an economical method of regulating the flow of current to the lamps without wasting energy.

The operation of the regulator may be traced as follows: As the resistance of the translating circuit is decreased by inserting more lights in multiple arc, more current will flow through the coil E'. This causes a higher counter electro-motive force in the coil E², and therefore less current flows through it; or, should the counter electro-motive force rise above that between the conductors $l'$ and $l^2$, then the current will flow in the opposite direction and supply the lamps. This will counteract the extra counter electro-motive force in the coil E' caused by more current flowing through it, the balance will be again resumed, and the lamps will remain at the same brilliancy. Should they not do so, by reason of the electro-motive force falling in in the coil B², causing a fall of potential in the conductors $l'$ $l^2$, then less current will flow through the coil E², causing less counter electro-motive force in the coil E', and bringing the electro-motive force in the conductors $l'$ $l^2$ to the normal again. Should the electro-motive force in the conductors $l'$ $l^2$ rise too high, the reverse action will take place. Translating devices $d'$ $d^2$ $d^3$, &c., may be included in multiple arc in the circuit L', as indicated in dotted lines.

In Fig. 2 translating devices $d'$ $d^2$ $d^3$, &c., are connected in multiple arc between the arms of the main conductor L', and the devices D' D² D³, &c., are included in multiple arc between the conductors $l'$ and $l^2$, as before. These conductors are led from the arms of the main L', or they may lead from the main of the dynamo without the intervention of a converter. The coil E' is included in one of them, $l^2$. The coil E² is connected across the conductors leading to and from the coil E', or in multiple arc with the translating devices $d'$ $d^2$ $d^3$, &c. In this manner whatever current traverses the translating devices D' D², &c., must traverse also the coil E'. By increasing the number of lights, and thus decreasing the resistance of the external translating-circuit, a greater amount of current is caused to traverse the coil E', and its magnetic effect becomes more nearly equal to or greater than that of the current in the coil E². As the inductive resistance of the coil E² is thus gradually increased, the amount of current allowed to traverse its coils decreases, and thus the lights between the arms $l'$ and $l^2$ are maintained at a constant brilliancy. Should they get above this point, more current will flow through the coil E'; consequently more work will be done in the coil E², causing more counter electro-motive force in the coil E'.

I claim as my invention—

1. The combination, substantially as hereinbefore set forth, of a source of electricity, its circuit, translating devices operated by electric energy supplied from said source, means for introducing and withdrawing more or less of said devices from circuit, and an inductive regulator applied to said circuit consisting of a conductor and magnetizable material to which it is applied, portions of said conductor being included in different circuits, thereby rendering the inductive resistance dependent upon the number of translating devices in circuit.

2. The combination, substantially as hereinbefore set forth, of a source of electricity, a circuit for the same, a magnetizing-coil, a mass of soft iron acted upon by currents traversing said magnetizing-coil, translating devices included in a branch circuit around the magnetizing-coil, a second magnetizing-coil applied to the iron, and means for causing variable currents to traverse the same.

3. The combination, substantially as hereinbefore set forth, of a source of electricity, a circuit supplied from said source, translating devices fed from said source, and an inductorium having its primary coil included in said circuit in series with the translating devices, and its secondary coil included in multiple arc with said translating devices.

4. The combination, substantially as hereinbefore set forth, of a source of electricity, a circuit supplied from said source, two coils included in said circuit, magnetizable material acted upon by currents traversing said coils, a shunt for one of said coils, and translating devices included in said shunt.

5. The combination, substantially as hereinbefore set forth, of a source of electricity, a circuit supplied therefrom, magnetizing-coils, soft iron acted upon thereby, a shunt-circuit around one of said coils, translating devices in said shunt, and an inductorium having its primary circuit included in circuit with said source, and its secondary in circuit with said magnetizing-coils.

6. The combination, substantially as hereinbefore set forth, with an electric generator and a circuit for the same, of an induction-coil having its primary coil in said circuit, a circuit including the secondary coil, means for varying the resistance of the secondary circuit, a soft-iron core and two coils acting upon said core, which coils are included in the secondary circuit.

7. The combination of a source of electric currents, a circuit supplied therefrom, two coils included in said circuit, magnetizable material acted upon by currents traversing said coils, and a shunt for one of said coils, in which said translating devices and the remaining coil are included.

8. The combination, substantially as hereinbefore set forth, of a source of electricity, a circuit supplied from said source, two coils included in said circuit, magnetizable material acted upon by currents traversing said coils, a shunt for one of said coils, translating devices included in said shunt, and translating devices connected in multiple arc across the poles of said source.

9. The combination of a source of electric currents, a circuit supplied therefrom, two coils included in said circuit, magnetizable material acted upon by currents traversing said coils, and a shunt for one of said coils, in which said translating devices and the remaining coil are included, and translating devices connected across the poles of said source.

10. The hereinbefore-described method of adjusting the brilliancy of incandescent electric lamps, which consists in opposing an inductive resistance to the currents supplied to the lamps, governing the difference of potential at the terminals of the lamps by said resistance, governing said resistance by another inductive resistance, and governing the latter by the difference of potential at the terminals of the lamps.

In testimony whereof I have hereunto subscribed my name this 7th day of May, A. D. 1886.

REGINALD BELFIELD.

Witnesses:
A. C. COLLINS,
JOHN C. WHEELER.